United States Patent [19]

Meixell

[11] 4,445,530
[45] May 1, 1984

[54] CORROSION PROTECTOR FOR WHEEL BRAKE ASSEMBLY BLEEDER VALVE

[75] Inventor: Richard D. Meixell, Dayton, Ohio

[73] Assignee: General Motors Corporation, Detroit, Mich.

[21] Appl. No.: 374,405

[22] Filed: May 3, 1982

[51] Int. Cl.³ .............................................. F16K 27/08
[52] U.S. Cl. .................................. 137/381; 220/288; 220/354; 220/DIG. 19; 251/351
[58] Field of Search ...................... 137/377, 381, 382; 188/325; 222/562, 542, 153; 220/DIG. 19, 288, 354; 251/351

[56] References Cited

U.S. PATENT DOCUMENTS

| | | | |
|---|---|---|---|
| 2,617,553 | 11/1952 | Lay | 222/562 |
| 2,685,300 | 8/1954 | Hammon | 137/382 |
| 3,428,208 | 2/1969 | Kosar | 220/288 |
| 4,203,508 | 5/1980 | Borkowski | 188/325 |
| 4,246,929 | 1/1981 | Wakeman | 137/382 |
| 4,307,748 | 12/1981 | Mathias | 137/381 |

*Primary Examiner*—Martin P. Schwadron
*Assistant Examiner*—Sheri Novack
*Attorney, Agent, or Firm*—D. D. McGraw

[57] ABSTRACT

A flexible cap, made of soft vinyl or rubber, slides over the ramp of the bleeder valve hex and grips tightly on the bleeder valve threads. The cap has matching threads molded into the cap inner wall. The cap is pushed over the bleeder valve and then screwed tightly against the brake housing face. Serrations on the cap sealing face may be filled with liquid sealant compressing against the casting. Vertical serrations are formed on the outer surface of the cap to provide a hand grip for screwing the cap in place.

4 Claims, 5 Drawing Figures

CORROSION PROTECTOR FOR WHEEL BRAKE ASSEMBLY BLEEDER VALVE

The invention relates to a plastic or rubber protector which fits over the wheel cylinder bleeder valve and seals it against external dirt and corrosive material. The protector may be readily installed and removed as necessary.

IN THE DRAWING

Figure 1:
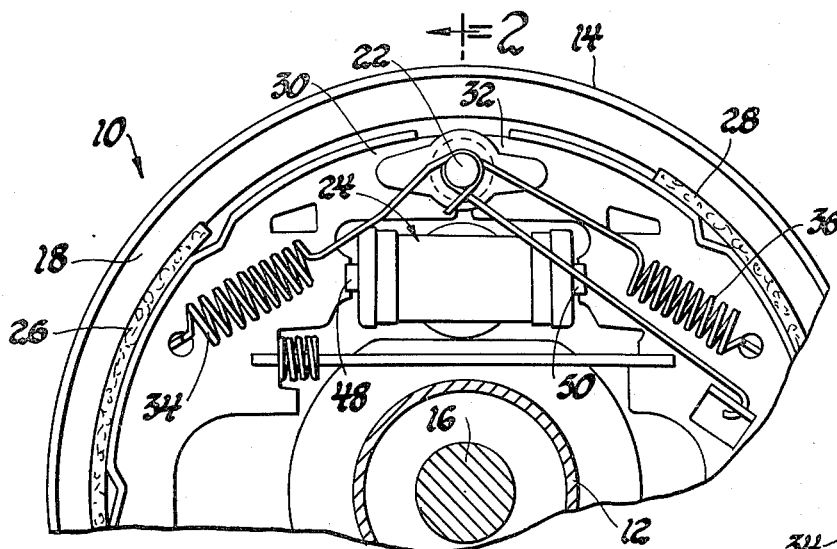
FIG. 1 is an elevation view, with parts broken away and in section, of a typical wheel brake assembly in which the invention may be used.
Figure 2:
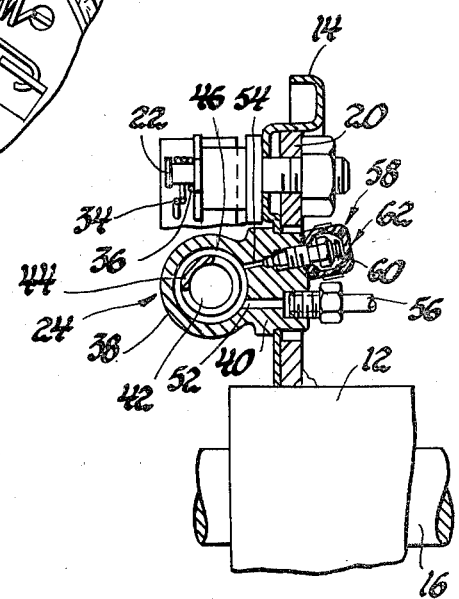
FIG. 2 is a cross-section view, taken in the direction of arrows 2—2 of FIG. 1 and having parts broken away, and particularly illustrating the wheel cylinder bleeder valve with the corrosion protector embodying the invention installed.

The brake assembly 10 is illustrated as being of the drum brake type in common use on the rear wheels of an automotive vehicle. However, the invention may be employed with other types of brake assemblies such as disc brakes. The brake assembly 10 includes a fixed axle housing 12 to which the backing plate 14 is secured. The axle 16, rotatable in axle housing 12, is suitably connected to a driving wheel and also has the brake drum 18 mounted for rotation therewith, as is well known in the art. As is better seen in FIG. 2, a mounting plate 20 is also secured to axle housing 12 and provides sufficient strength and support for the mounting of the anchor pin 22 and the wheel cylinder 24. The primary brake shoe assembly 26 and the secondary brake shoe assembly 28 are suitably mounted on the backing plate 14 so that one pair of brake shoe adjacent ends 30 and 32 are in engagable relation with the anchor pin 22. Retraction springs 34 and 36 are suitably connected to the shoe assemblies 26 and 28 and the anchor pin 22 so as to hold the shoes in the retracted position, out of engagement with the brake drum 18, when the brake assembly is in the released position.

Figure 3:
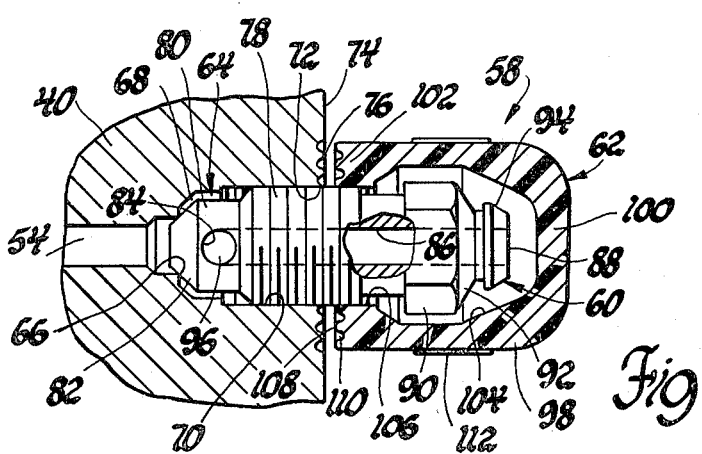
FIG. 3 is an enlarged fragmentary cross-section view of a portion of FIG. 2 showing the protector in the process of being installed.

The wheel cylinder 24 includes a housing 38 provided with a boss 40 which extends through mounting openings in the backing plate 14 and the mounting plate 20. The wheel cylinder is typically constructed to include a pair of wheel cylinder pistons, one such piston 42 being illustrated in FIG. 2, a piston spring 44 between the pistons and located in wheel cylinder pressure chamber 46, and wheel cylinder pins 48 and 50 which are moved by the wheel cylinder pistons so as to move the brake shoes 26 and 28 toward engagement with drum 18 when brake pressure is introduced into chamber 46. As is better seen in FIG. 2, the wheel cylinder 24 is provided with an inlet port 52 and a bleeder passage 54 formed through the boss 40 and extending into chamber 46. Bleeder passage 54 opens into chamber 46 near the top of that chamber so that air trapped therein can be bled out of the system. Both port 52 and passage 54 open through the inboard side of the boss 40. The brake line 56 is connected to the inlet port 52 to provide brake actuating pressure from a suitable source such as a master cylinder, not shown. The bleeder assembly 58 is installed in the bleeder passage 54 and is illustrated in greater detail in FIGS. 3 and 4. Essentially, the bleeder assembly 58 includes a bleeder valve unit 60 and the protection cap 62 embodying the invention. As is better shown in FIGS. 3 and 4, the bleeder passage 54 has an enlarged outer portion 64 forming a valve seat 66, a valve chamber 68 and an internally threaded portion 70. The threaded portion 70 extends to the outer end 72 of passage 54, which opens through the outer wall surface 74 of the boss 40 forming a part of housing 38. Suitable serrations or a land-and-groove configuration 76 are provided on the outer wall surface 74 around the outer end 72 of bleeder passage 54. The serrations or grooves are preferabley formed generally circumferentially.

The bleeder valve unit 60 is generally similar to bleeder valve units in current production use. The unit is provided with external threads 78 on the center portion thereof. The unit slightly reduced diameter inner end 80 has the extreme end portion thereof conically beveled to define a valve member 82 which is engagable with the valve seat 66. The inner end 80 fits within the chamber 68 and is of somewhat smaller diameter than that chamber so that, when the valve member 82 is spaced from the valve seat 66, fluid may flow from the inner portion of passage 54 through the valve and into chamber 68. A cross passage 84 formed in the inner end 80 of the valve unit communicates with chamber 68 and with an axially formed passage 86 extending outwardly through the valve unit 60 from passage 84. Passage 86 has its outer end 88 opening through the outer end of the valve unit. The outer portion of the valve unit 60 is provided with a head 90 formed in a hex nut configuration for easy installation and removal of the valve unit by a suitable wrench. The outer side surface 92 of head 90 is conically beveled as shown. The extreme outer end of valve unit 60 is provided with a beveled land 94 so that a bleeder tube may be fitted over the end of valve unit 60 while the bleeding operation is taking place. Any brake fluid bled from the wheel cylinder chamber 46 in the process of bleeding can then be directed into a suitable container. The outer dimension of the head 90 is preferably slightly larger than the outer dimension of the external threads 78. The external threads 78 are of sufficient axial length so that several threads extend outwardly beyond the outer wall surface 74 when the bleeder valve unit 60 has been threaded sufficiently far into passage 54 to have valve 82 seated in sealing relation against valve seat 66. When the valve is so closed, no fluid in chamber 46 can flow past the valve seat 66, and the outlet 96 formed by the cross passage 84 and the axial passage 86 is not in communication with the inner portion of the bleeder passage 54.

The protection cap 62 is made of a suitable flexible material such as a soft vinyl or rubber. It has a generally cylindrical cap body 98 provided with a closed end 100 and an open end 102. The interior portion of body 98 forms a recess 104 which is larger in diameter than the valve unit head 90. The open end 102 is somewhat smaller in diameter than the head 90 of valve unit 60, and is formed with internal threads 106 which may mate in threaded relation with the external threads 78 of the valve unit 60. The open end 102, including threads 106, is sufficiently flexible so that the cap 62 may be installed over the valve unit head 90 by pushing the cap over the head. The open end 102 will expand diametrically to a sufficient extent to accommodate the head 90, and will return to its smaller diameter condition after it passes over the head. The internal threads 106 are then in position to be threaded onto the external threads 78. It is preferable that the internal threads 106 are sufficiently flexible so that the cap 62 may be pushed axially further onto the valve unit 60, the internal threads 106 permitting such axial movement without corresponding rotational action. Thus the cap is pushed over the valve unit 60 sufficiently to provide threaded engagement between threads 106 and 78. The cap face surface 108 formed on the face of open end 102 is provided with suitable serrations or lands-and-grooves 110 which are in a mating configuration with the serrations or lands-and-grooves 76 formed on the outer wall surface 74 of housing 40. When the cap is moved sufficiently far axially along valve unit 60, the serrations 110 engage the serrations 76. The cap may then be tightened by a threading action, rotating it to further engage the serrations of the cap and the housing. External grip serrations or lands 112 may be provided on the exterior surface of the generally cylindrical cap body 98 to assist in gripping the cap for this purpose. In some instances it may be desirable to provide a suitable sealant in the serrations 76 or 110, or both, to assure the desired amount of sealing between the cap and the housing. The sealant used should be flowable to accommodate to the serrations. It may be pre-set or may set in place. In either case it will increase the effectiveness of the seal between the cap and the housing.

Figure 4:
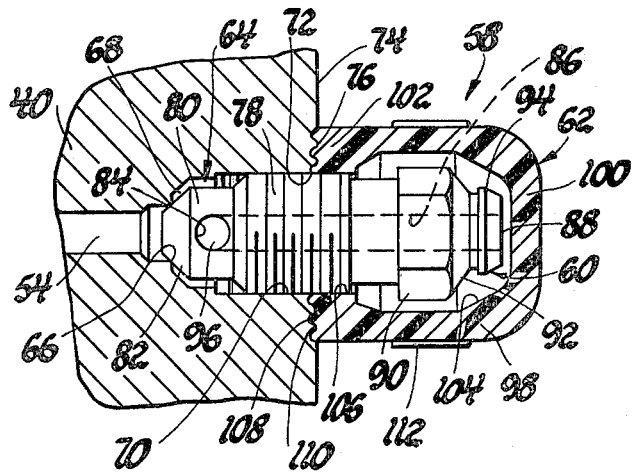
FIG. 4 is a fragmentary cross-section view similar to FIG. 3 and illustrating the protector in the fully installed condition.
Figure 5:
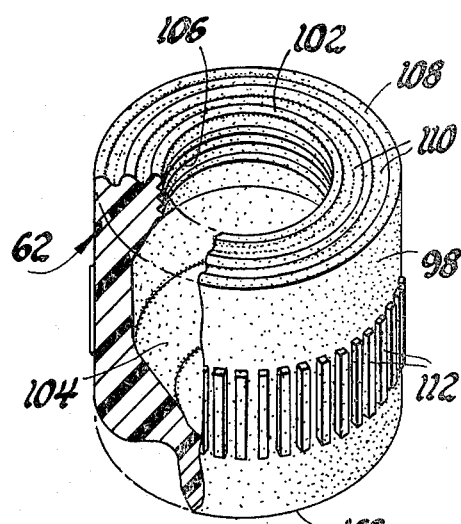
FIG. 5 is a perspective view of the corrosion protector embodying the invention.

The cap is shown in FIG. 4 in its fully installed position wherein the serrations 76 and 110 are merged together in sealing relation. Thus the cap 62 fully protects the valve unit threads 78 and the valve unit axial passage 86 from corrosion, as well as other portions of the valve unit.

When it is desired to bleed the brake circuit in which the wheel cylinder 24 is connected, the operator can remove the protection cap 62 by threading it off of the external threads 78 and then pulling it axially over the valve unit head 90 so as to remove it. The remaining steps in the bleeding operation are the same as those that have been practiced in the brake art for many years. Essentially, a tube is placed over the valve unit beveled land 94 and led to a receptacle, the valve unit 60 is threaded out of passage 54 sufficiently to disengage valve member 82 from valve seat 66, and the brake circuit is pressurized. Thus any air trapped in the upper portion of the wheel cylinder chamber 46 will be forced out of bleeder passage 54 past the valve seat 66, into chamber 68, and then through the outlet 96 into the tube. When all of the air has been bled out, the operator re-tightens the valve unit 60 so as to again seat valve member 82 against the valve seat 66. The tube is then removed from the beveled land 94, and the protection cap 62, or a new cap, zs again placed over the bleeder valve unit 60 and sealed as above described.

I claim:

1. In a vehicle brake assembly occasionally exposed to corrosive agents and having a housing defining a hydraulic fluid chamber adapted to communicate with atmosphere through a bleed passage, the improvement comprising:

means coacting with said housing at said bleed passage in a manner to facilitate the bleeding of air from said chamber while preventing corrosion by said corrosive agents, said means including a bleeder valve unit threaded into said bleed passage and having threads positioned outside as well as inside said bleed passage, said bleeder valve unit having a head outwardly adjacent said threads in axially spaced relation thereto, said head having a larger lateral dimension than the lateral dimension of said threads;

and a protection cap having a flexible body defining an open-ended cavity for receiving therein said bleeder valve unit head and outside threads, the body of said cap at said open end having internal threads adapted to engage the threads of said bleeder valve unit positioned outside said bleed passage and external seal-enhancing land-and-groove means adapted to sealingly engage said housing when said bleeder valve unit is received in said cavity and after the internal threads of said cap engage the outside threads of said bleeder valve unit, said cap being sufficiently flexible to be axially pushed over said bleeder valve unit head until the internal threads of said cap move past said head and then threadedly engage the outside threads of said bleeder valve unit, said cap thereafter being twistable in coaction with said outside threads to thereafter sealingly engage the land-and-groove means with the housing, said cap being removable for bleeding air and replaceable for preventing exterior corrosive agents from corroding said unit and particularly said threads.

2. In a vehicle brake assembly having a hydraulic fluid chamber in a housing which must be bled occasionally to remove air from the brake system of which the assembly is a part, and a bleed passage in said housing connecting said chamber with atmosphere:

a bleeder valve unit threaded into said bleed passage and having threads positioned outside as well as inside said bleed passage, said bleeder valve unit having a head outwardly adjacent said threads in axially spaced relation thereto, said head having a larger lateral dimension than the lateral dimension of said threads;

and a protection cap having a flexible recessed body provided with a closed end and an open end and having internal threads on the inner peripheral portion of said body immediately adjacent and extending to said open end, seal-enhancing land-and-groove means on the face surface of said open end, external grippable means on said body for turning the cap and threading the cap on said unit threads positioned outside said bleed passage to sealingly engage said land-and-groove means with the outer wall of said housing around said unit, said cap being sufficiently flexible and expandable and retractable to be pushed over said unit head until said cap threads move past said head and then threadedly engage said unit threads in threaded relation before said cap land-and-groove means sealingly engage the housing outer wall, said cap being removable and replaceable and when sealingly in place preventing exterior corrosive agents from corroding said unit and particularly said threads.

3. In a vehicle brake assembly having a hydraulic fluid chamber in a housing which must be bled occasionally to remove air from the brake system of which the assembly is a part, and a bleed passage in said housing connecting said chamber with atmosphere:

a bleeder valve unit threaded into said bleed passage and having threads positioned outside as well as inside said bleed passage, said bleeder valve unit having a head outwardly adjacent said threads in axially spaced relation thereto, said head having a larger lateral dimension than the lateral dimension of said threads;

and a protection cap having a flexible recessed body provided with a closed end and an open end and having internal threads on the inner peripheral portion of said body immediately adjacent and extending to said open end, seal-enhancing land-and-groove means on the face surface of said open end, external grippable means on said body for turning the cap and threading the cap on said unit threads positioned outside said bleed passage to sealingly engage said land-and-groove means with the outer wall of said housing around said unit, and a flowable sealant between said cap and housing land-and-groove means which when set increases the effectiveness of the seal between said cap and said housing, said cap being sufficiently flexible and expandable and retractable to be pushed over said unit head until said cap threads move past said head and then threadedly engage said unit threads in threaded relation before said cap land-and-groove means sealingly engages the housing outer wall, said cap being removable and replaceable and when sealingly in place preventing exterior corrosive agents from corroding said unit and particularly said threads.

4. A protected brake assembly bleeder valve comprising:

a brake assembly housing having an outer surface, a chamber requiring occasional bleeding, and a bleeder passage through a housing wall opening into said chamber and through said outer surface;

a bleeder valve unit secured in said bleeder passage through said outer surface and extending outwardly beyond said outer surface, said unit having a portion with threads formed thereon threaded into said bleeder passage and extending outwardly beyond said outer surface, and having a head outwardly adjacent said threads in axially spaced relation thereto, said head having a larger lateral dimension than the lateral dimension of said threads, said unit normally closing said bleeder passage;

and a flexible cap fitted over the part of said bleeder valve unit which extends outwardly beyond said outer surface, said cap having an open end and a generally cylindrical body and a closed end to define a cover for all portions of said bleeder valve unit extending outwardly beyond said brake assembly housing outer surface, said cap open end having an end face surface with a series of generally circumferentially extending serrations formed therein and engaging a mating portion of said outer surface about said bleeder valve unit in sealing relation, the inner peripheral wall of said generally cylindrical body adjacent said open end having flexible internal threads formed therein and mating with the threads of said unit extending outwardly beyond said outer surface, said cap open end and internal threads being sufficiently radially expandible to have been pushed axially over said bleeder valve unit head so that said internal threads threadedly engage at least some part of the bleeder valve unit external threads, said cap having been thereafter rotated to screw said cap serrations tightly against said housing outer surface, said cap having gripping means externally formed on said generally cylindrical body for assisting in threading said cap onto and off of said bleeder valve unit.

* * * * *